(12) United States Patent
Mitteer

(10) Patent No.: US 6,520,060 B2
(45) Date of Patent: Feb. 18, 2003

(54) CUT-OFF MECHANISM FOR ELONGATE STOCK

(75) Inventor: John R. Mitteer, Greenville, MI (US)

(73) Assignee: J.M. Systems Company, Rockford, MI (US)

( * ) Notice: Subject to any disclaimer, the term of this patent is extended or adjusted under 35 U.S.C. 154(b) by 0 days.

(21) Appl. No.: 09/802,210

(22) Filed: Mar. 8, 2001

(65) Prior Publication Data

US 2001/0032536 A1 Oct. 25, 2001

Related U.S. Application Data

(63) Continuation of application No. 08/831,507, filed on Mar. 31, 1997, now abandoned.

(51) Int. Cl.[7] .................................................. B26D 1/30
(52) U.S. Cl. ............................. 83/560; 83/563; 83/607; 83/644; 83/675
(58) Field of Search .......................... 83/558, 560, 563, 83/597, 605, 607, 608, 609, 673, 675, 694, 907, 950, 644, 646, 647; 72/326, 332, 387, 388; 30/238

(56) References Cited

U.S. PATENT DOCUMENTS

| | | | | |
|---|---|---|---|---|
| 308,148 A | * | 11/1884 | Folsom | 30/238 |
| 410,345 A | * | 9/1889 | Benson et al. | 30/238 |
| 1,082,629 A | * | 12/1913 | Hadaway | 69/11 |
| 1,842,229 A | * | 1/1932 | Achard | 83/647.5 |
| 2,130,818 A | * | 9/1938 | Soderberg | 409/331 |
| 2,900,722 A | * | 8/1959 | Weisenburger | 30/238 |
| 3,003,381 A | * | 10/1961 | Biel et al. | 83/638 |
| 3,004,458 A | * | 10/1961 | Dvorak | 100/233 |
| 3,180,194 A | * | 4/1965 | Locke | 83/33 |
| 4,567,802 A | * | 2/1986 | Witherspoon | 83/581 |

* cited by examiner

Primary Examiner—Kenneth E. Peterson
(74) Attorney, Agent, or Firm—Price, Heneveld, Cooper, DeWitt & Litton

(57) ABSTRACT

A cut-off mechanism for forming metal parts from elongate stock and the like includes a first jaw having a laterally inclined first cutting surface that extends between a sharpened leading edge and a trailing edge. A second jaw has a laterally inclined second cutting surface that extends between a sharpened leading edge and a trailing edge. A connector pivotally interconnects the first and second jaws in a side-by-side relationship at a location spaced apart from the first and second cutting surfaces. The connector positions the leading edges of the first and second cutting surfaces in close planar alignment to shear cut stock positioned therebetween. The leading edge of the first cutting surface has a hook-shaped side elevational configuration extending arcuately between an outer tip portion thereof and an inner base portion thereof. When the first and second jaws are pivotally converged, stock positioned between the first and second cutting surfaces adjacent the outer tip portion of the leading edge of the first cutting surface is incrementally shear cut through its entire thickness to cleanly sever the same to length with minimal jolt.

17 Claims, 4 Drawing Sheets

CUT-OFF MECHANISM FOR ELONGATE STOCK

CROSS-REFERENCE TO RELATED APPLICATIONS

The present application is a continuation of U.S. patent application Ser. No. 08/831,507, filed on Mar. 31, 1997, now abandoned, entitled CUT-OFF MECHANISM FOR ELONGATE STOCK, the entire contents of which are hereby incorporated by reference.

BACKGROUND OF THE INVENTION

The present invention relates to a cut-off mechanism for elongate stock and the like, and in particular to a shear-type cutter with a hook-shaped side elevational configuration.

Various machines are used to form wire parts, including machines that form coil springs or other parts formed from elongate metal stock. An example is heavy duty coil springs for vehicle suspensions and the like, which are made from larger diameter wire or rod for certain applications, with the wire diameter often exceeding one quarter of an inch, and can be as great as five eights an inch in diameter. After forming, the spring is typically cut off from the stock being fed into the forming machine by a cutter die that uses converging cutting edges to "nip " cut the wire or rod. Nip cutters utilize opposing "V" shaped cutting surfaces that are aligned along the edge of the "V" shape. During cut off, the edges are brought together, thereby deforming the stock and severing the spring. A large force is required to nip cut larger diameter stock, and the sudden release of this force when the cutting edges sever the stock causes a severe "jump" or "jolt" at the moment of separation. This sudden jarring motion caused by the large forces involved creates vibrations and/or movements which are not only uncomfortable for nearby workers, but also may damage machine parts, leading to short tool life. This jarring action or shock load will also jar the machinery out of alignment, requiring costly downtime, and/or cause excessive wear.

By way of example, U.S. Pat. No. 1,835,589 to Bond discloses a linearly actuated cutter for use with a device for forming coil springs. U.S. Pat. No. 2,809,678 to Silko discloses a pivotally mounted clipper having a straight shearing edge for cutting off the end of a spring after it is formed in a spring coiling machine. U.S. Pat. No. 4,873,854 to Russell et al. discloses a cutting tool having a straight cutting edge that is pivotally mounted for cutting off a coil spring after the forming operation.

Although these cut-off devices will sever a formed coil spring, the large cutting forces generated, particularly with larger diameter stock, create excessive noise, and an undesirable jarring motion or "jolt" when shearing the elongate stock.

SUMMARY OF THE INVENTION

One aspect of the present invention is to provide a cut-off mechanism for forming metal parts from elongate stock and the like. The cut-off mechanism includes a first jaw having a laterally inclined first cutting surface extending between a sharpened leading cutting edge and a trailing edge. A second jaw has a laterally inclined second cutting surface extending between a sharpened leading cutting edge and a trailing edge. A connector assembly pivotally interconnects the first and second jaws in a side-by-side relationship at a location spaced apart from the first and second cutting surfaces. The connector positions the leading edges of the first and second cutting surfaces in close planar alignment to shear cut stock that is positioned therebetween. The leading edge of the first cutting surface has a hook-shaped side elevational configuration extending arcuately between an outer tip portion thereof and an inner base portion thereof. When the first and second jaws are pivotally converged, stock positioned between the first and second cutting surfaces adjacent the outer tip portion of the leading edge of the first cutting surface is incrementally shear cut through its entire thickness to cleanly sever the same to length with minimal vibration or jolt.

Another aspect of the present invention is to provide in a metal forming machine of the type fabricating elongate stock, an improved cut-off mechanism therefor. The cut-off mechanism includes a first jaw having a laterally inclined first cutting surface extending between a sharpened leading edge and a trailing edge. A first cutting edge has a hook-shaped side elevational configuration extending arcuately between an outer tip portion and an inner base portion thereof. The cut-off mechanism further includes a second jaw having a laterally inclined second cutting surface extending between a sharpened leading edge and a trailing edge. The second jaw is pivotally connected with the first jaw in a side-by-side relationship at a location spaced apart from the first and second cutting surfaces. The leading edges of the first and second cutting surface are in close planar alignment to shear cut stock positioned therebetween. A motor is operably connected with at least one of the first and second jaws and mutually rotates the same such that when the first and second jaws are converged, stock positioned between the first and second cutting surfaces adjacent the outer tip portion of the first cutting edge is incrementally shear cut through its entire thickness to cleanly sever the same to length with minimal jolt.

Another aspect of the present invention is to provide a cut-off mechanism for forming metal parts from elongate stock and the like. The mechanism includes a first jaw having a laterally inclined first cutting surface extending between a sharpened leading edge and a trailing edge. A second jaw has a laterally inclined second cutting surface extending between a sharpened leading edge and a trailing edge. A connector assembly translationally pivotally interconnects the first and second jaws in a side-by-side relationship at a location spaced apart from the first and second cutting surfaces. The connector assembly positions the leading edges of the first and second cutting surfaces in close planar alignment to shear cut stock positioned therebetween. The leading edge of the first cutting surface has a hook-shaped side elevational configuration extending arcuately between an outer tip portion thereof and an inner base portion thereof. When the first and second jaws are converged, stock positioned between the first and second cutting surfaces adjacent the outer tip portion of the first cutting edge is incrementally shear cut through its entire thickness to cleanly sever the same to length with minimal jolt. The principal objects of the present invention are to provide a cut-off mechanism for wire coiling machines and other similar fabrication machinery. The cut-off mechanism includes first and second jaws which are pivotally interconnected. The first jaw has a cutting edge with a hook-shaped side elevational configuration that facilitates shear cutting of large diameter stock.

These and other advantages of the invention will be further understood and appreciated by those skilled in the art by reference to the following written specification, claims, and appended drawings.

DETAILED DESCRIPTION OF PREFERRED EMBODIMENT

Figure 2A:
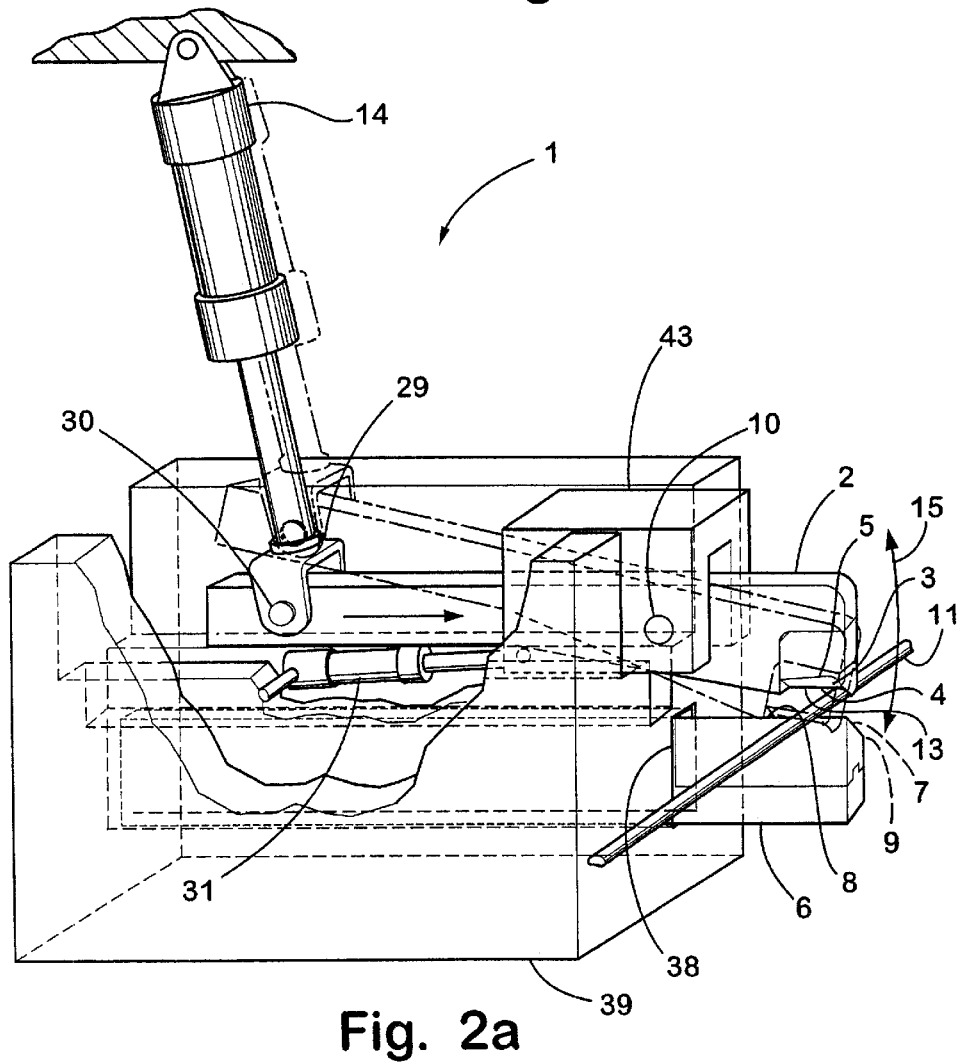
FIG. 2a is a partially schematic, perspective view of the cut-off mechanism.

For purposes of description herein, the terms "upper," "lower," "right," "left," "rear," "front," "vertical," "horizontal," and derivatives thereof shall relate to the invention as oriented in FIG. 2a. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
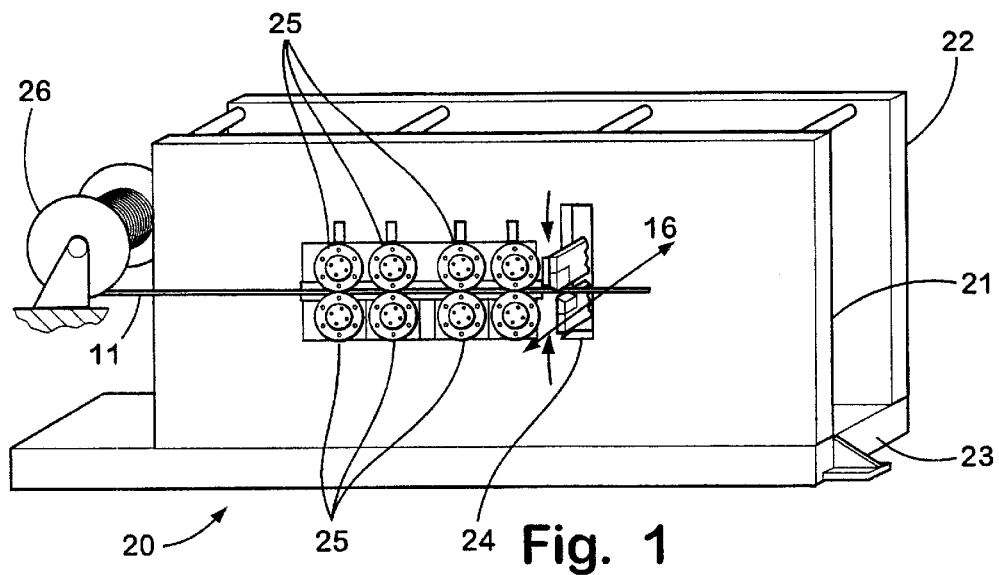
FIG. 1 is a partially schematic, perspective view of a wire forming machine used in conjunction with the cut-off mechanism of the present invention, showing the translational direction of the first jaw of the cut-off mechanism.

The reference numeral 1 (FIG. 2a) generally designates a cut-off mechanism embodying the present invention, which is particularly designed for use with a large wire or rod forming machine such as the coil spring fabricating machine 20 illustrated in FIG. 1. With reference to FIG. 2a, the cut-off mechanism 1 includes a first jaw 2 having a laterally inclined first cutting surface 3 extending between a sharpened leading or cutting edge 4 and a trailing edge 5. A second jaw 6 has a laterally inclined second cutting surface 7 extending between a sharpened leading or cutting edge 8 and a trailing edge 9. A connector assembly, such as pin 10, U-shaped block 43, and guide block 39 pivotally interconnects the first and second jaws 2, 6 in a side-by-side relationship at a location spaced apart from the first and second cutting surfaces 3, 7. As discussed below, first jaw 2 also translates with respect to second jaw 6, such that jaws 2 and 6 are both pivotally and translationally interconnected. The connector assembly positions the leading edges 4, 8 of the first and second cutting surfaces 3, 7 in close planar alignment to shear cut stock 11 positioned therebetween. The leading edge 4 of the first cutting surface 3 has a hook-shaped side elevational configuration extending arcuately between an outer tip portion 12 and an inner base portion 13 thereof. When the first and second jaws 2, 6 are pivoted toward their closed position, stock 11 positioned between the first and second cutting surfaces 3, 7 adjacent the outer tip portion 12 of the leading edge 4 of the first cutting surface 3 is incrementally shear cut through its entire thickness to cleanly sever the same to length with minimal jolt or vibration.

A motor or first actuator 14 is operably attached to the first jaw 2 by means of a large clevis 29 for powered rotation about the pin 10 as illustrated by the arrow shown as 15 in FIG. 2a. In the preferred embodiment, the first actuator 14 is a hydraulic cylinder. Although the first jaw 2 is illustrated as being rotationally interconnected to the second jaw 6 by pin 10, U-shaped block 43, and guide block 39, the unique hook-shaped cutting edge could be used with linear or other translational interconnections for various applications if desired.

With reference to FIG. 1, the cut-off mechanism 1 of the present invention is used in conjunction with an arborless wire forming machine 20 having a pair of thick side plates 21 and 22 supported on a bed 23. An arborless wire forming mechanism (not shown) is positioned exterior to side plate 21 adjacent the rectangular window 24. A series of wire feed rolls 25 are positioned upstream of the wire forming mechanism, and serve to feed the wire or rod for formation into a spring. The wire or other elongate stock 11 is fed from a large coil or roll 26 through the feed rolls 25, after which it is formed into a helix spring. The second actuator 31 then longitudinally shifts the first jaw 2 of the cut-off mechanism 1 in the direction indicated by arrow 16 outwardly from the interior of the wire forming machine 20 through the rectangular window 24 in the side plate 21. The first actuator 14 then rotates the first jaw 2 about the pin 10, thereby cleanly severing the helix spring from the stock 11 entering the wire forming machine 20. Once the wire has been severed, the spring part drops into a collection bin, the first jaw 2 retracts back into the interior of the wire forming machine 20 to provide clearance for the wire forming operation, and the cycle is repeated. The translational distance of first jaw 2 may be adjusted larger or smaller as required for clearance and proper cutting surface alignment as required for larger or smaller springs and stock diameter. In addition, the second jaw 6 may be adjusted to extend further outwardly as required for a particular application. The second jaw 6 is then fixed in the desired position by a clamp (not shown). Once the second jaw 6 is in a fixed position for a particular application, it does not translate during the cut-off operation.

Figure 3:
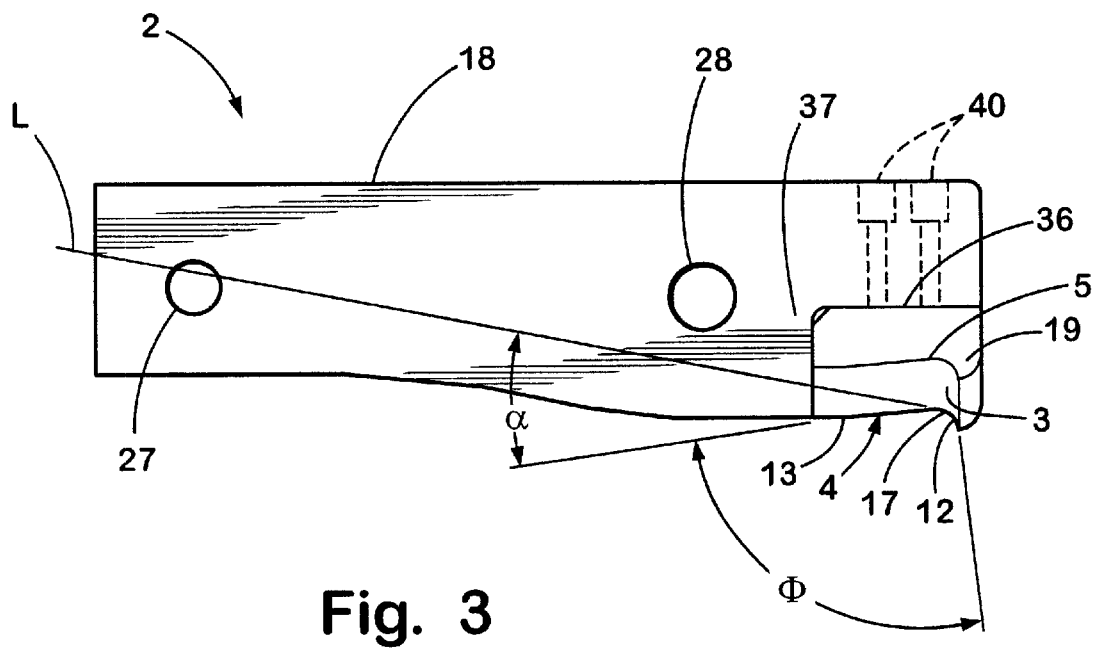
FIG. 3 is a side elevational view of the first jaw.

With reference to FIG. 3, the sharpened leading edge 4 includes an outer tip portion 12, and an inner base portion 13 with an arcuate portion 17 disposed between the outer and inner portions of the leading edge 4, thereby forming a hook-shaped side elevational configuration. Preferably, the arcuate portion 17 has a radius that it approximately equal to that of the stock being cut. However, the cut-off mechanism can be used with stock that has a radius that is smaller than the arcuate portion 17. Although most applications require a radius in the range of 0.125 to 0.375 inches, a larger or smaller radius may be used as required for very large or very small diameter stock, respectively. In addition, several hardened inserts may be fabricated, with each insert having an arcuate portion 17 with a different size radius. An insert may then be selected and installed in the upper jaw 2 as required for larger or smaller diameter stock. The unique hook-shaped leading edge 4 is particularly advantageous for cutting larger diameter stock, and allows a relatively continuous shearing cutting action through the entire thickness of the stock, with minimal "jolt" or "jarring" motion when the wire is sheared.

The outer tip portion 12 and the inner base portion 13 of the first leading or cutting edge 4 form a mutually included angle shown as θ which is preferably about 90 degrees, but could vary in the range of about 90 degrees to 160 degrees. The first jaw 2 includes an elongated body portion 18 which is made from low carbon steel. An insert 19 is attached to the body portion 18 by screws 40 and is preferably made of a high carbon hardened tool steel. The leading edge 4, laterally inclined first cutting surface 3, and trailing edge 5 are formed on the insert 19. The insert 19 has a width of about 2 inches, a height of about 2 inches, and a thickness of about 1 inch in a preferred embodiment. Although the preferred embodiment utilizes a hardened steel insert material, other suitable materials, such as a ceramic, could also be utilized if desired for a particular application. The body portion 18 includes a first aperture 27 which receives a connector such as pin 30 for pivotal connection to the first actuator 14. The body portion 18 also includes a second aperture 28 which receives a pin 10 to operably connect the first jaw 2 to a second actuator 31 by means of U-shaped block 43. The second actuator 31 longitudinally shifts the U-shaped block 43 and first jaw 2 in the direction indicated by arrow "16" shown in FIG. 2 during operation of the cut-off mechanism 1. U-shaped block 43 is slidably retained by guide block 39 for translational movement. In addition, first jaw 2 is pivotable about pin 10, thereby providing a pivotable interconnection with second jaw 6.

Figure 4:
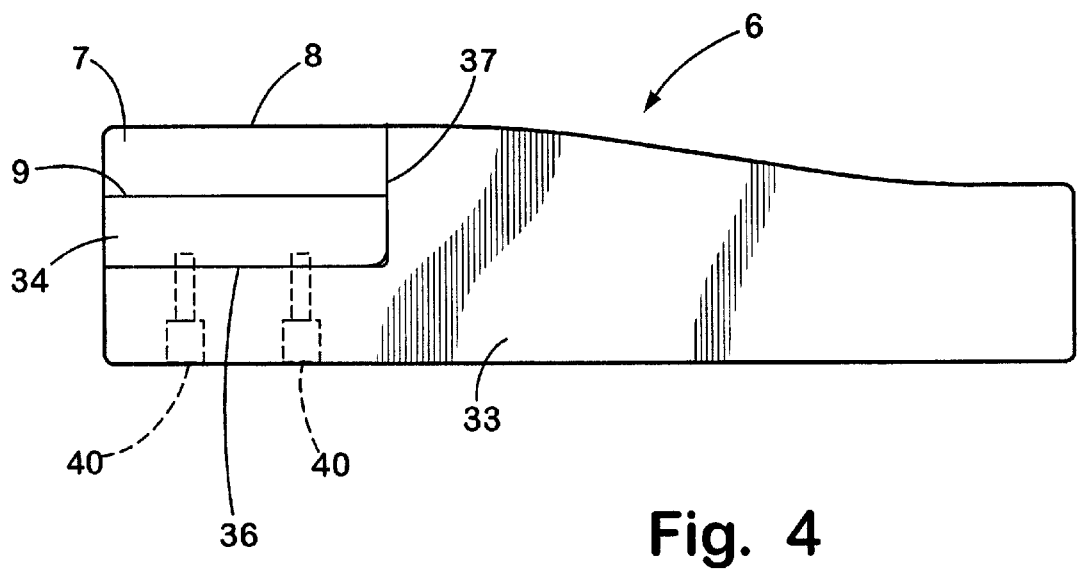
FIG. 4 is a side elevational view of the second jaw.

As illustrated in FIG. 4, the second jaw 6 comprises an elongated body portion 33 which is made from low carbon steel, and includes a hardened insert 34 which forms the laterally inclined second cutting surface 7, the sharpened second leading edge 8, and the trailing edge 9. In a preferred embodiment, the sharpened leading edge 8 is substantially straight for ease of fabrication. Both of the hardened steel inserts 19 and 34 may include a keyed connection indicated at 35 along both the horizontal connecting edge 36, and the vertical connecting edge 37.

Figure 2B:
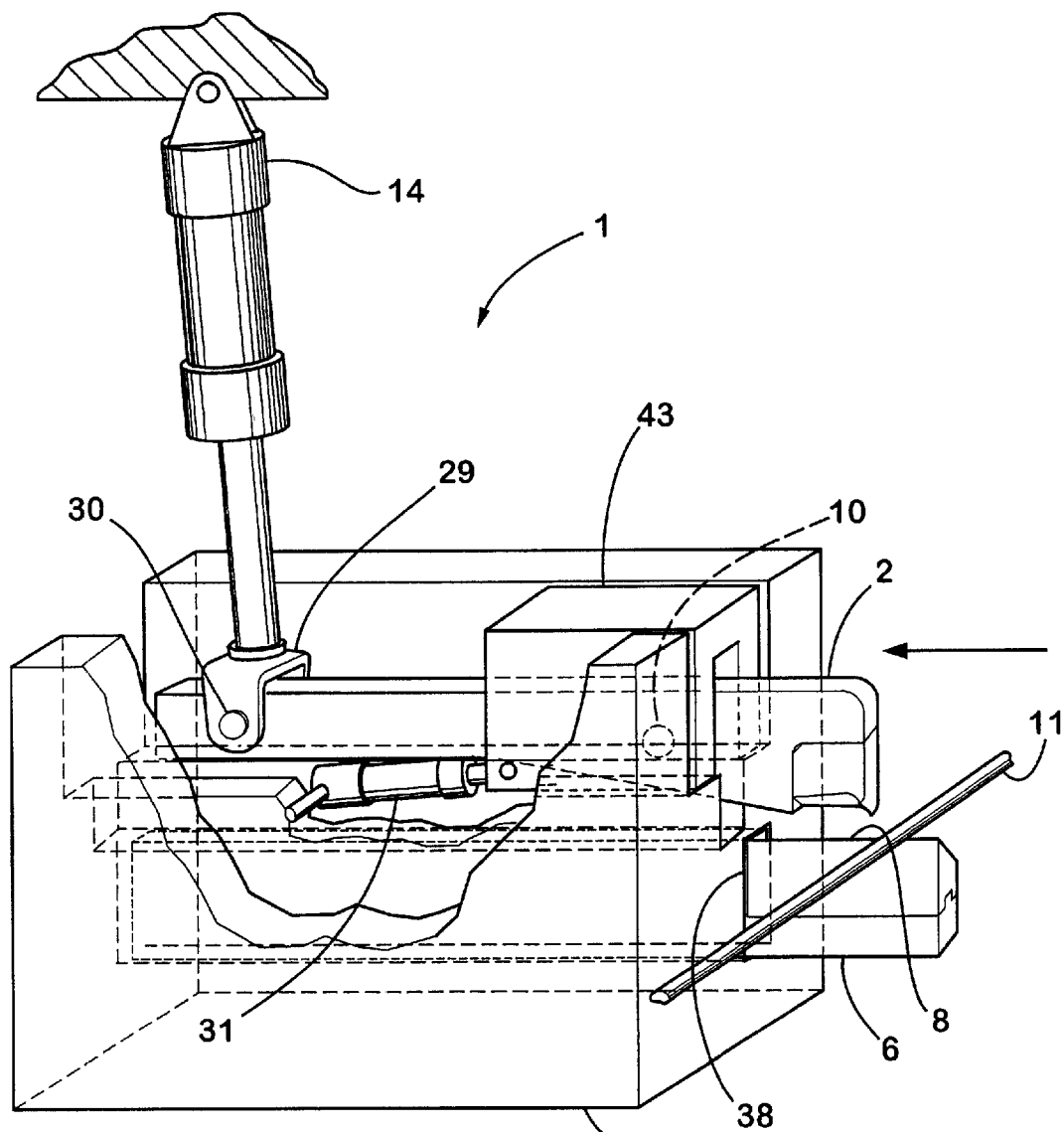
FIG. 2b is a partially schematic, perspective view of the cut-off mechanism with the first jaw in the retracted position.

With reference to FIG. 2, the second jaw 6 is slidably received in a rectangular aperture 38 in guide block 39 (shown in phantom), thereby allowing the second jaw 6 to translate inwardly or outwardly as required for a particular application. After the second jaw 6 is properly located, a clamp (not shown) fixes the second jaw 6 in the guide block 39 to prevent movement during the cut-off operation.

Figure 5:
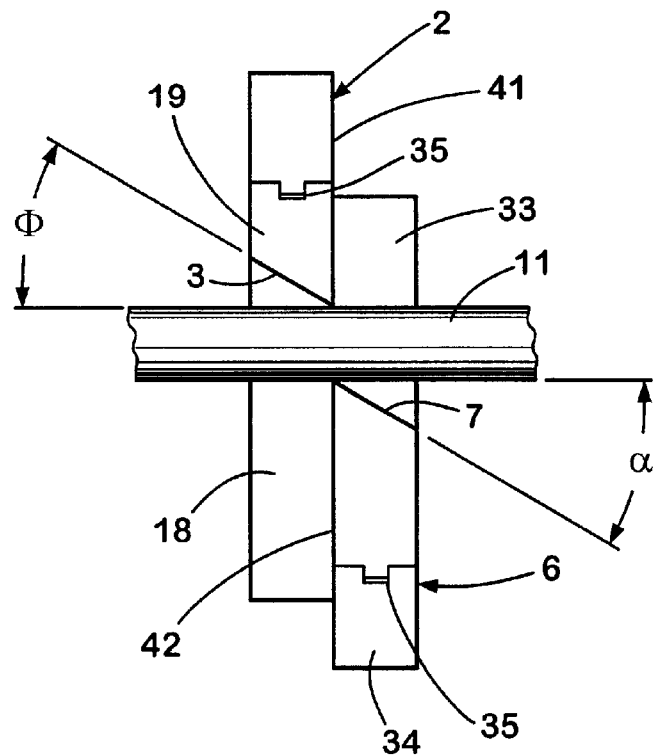
FIG. 5 is a fragmentary, front elevational view of the cut-off mechanism showing the leading edges of the cutting surfaces initially contacting the elongate stock.
Figure 6:
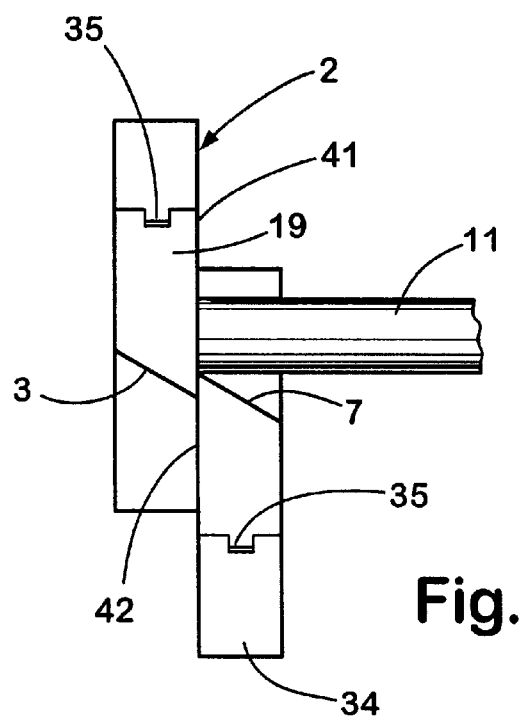
FIG. 6 is a fragmentary, front elevational view of the cut-off mechanism with the jaws in the fully converged position.

The first and second cutting surfaces 3, 7 are laterally inclined at an angle of about 30 degrees, shown as angles $\phi$ and $\alpha$ in FIGS. 5 & 6. However, these angles could have a range of 0 to 45 degrees. As illustrated in FIG. 3, the inner base portion 13 of cutting edge 4 has an angle $\gamma$ of about 30 degrees relative to a line "L" extending through the center of aperture 27 and the arcuate portion 17 of the cutting edge 4. The increased angle of engagement between the first and second cutting edges 4, 8 urges the stock 11 into the arcuate portion 17 of the cutting edge 4 when the first and second cutting edges 4, 8 initially contact the stock, and during the shear cutting of the stock.

With reference to FIGS. 5 & 6, when the first and second jaw 2, 6 are brought into the fully engaged position of FIG. 6, the stock 11 is cleanly severed with a minimal "jarring" or "jolt." The jaws 2, 6 remain in close planar alignment throughout the cut-off operation. Due to the angle of cutting surfaces 3 and 7, side forces are generated, thereby urging the cutting edges 4 and 8 together. The inner side faces 41 and 42 of the upper and lower jaws 2 and 6, respectively, slidingly engage one another during the cut-off operation, reacting the side forces and, in conjunction with the pins 10 and 30, U-shaped block 43, and guide block 39, maintain the jaws in close planar alignment throughout the cut-off operation.

During operation of the cut-off mechanism 1, the second actuator 31 shifts the first jaw 2 longitudinally outward in the direction indicated by the arrow 16. The first actuator 14 then rotates the first jaw 2 in the direction indicated by the arrow 15 in FIG. 2a, thereby bringing the sharpened leading edge 4 into contact with the stock 11. The inner base portion of the leading edge 4 ensures that the stock 11 is positioned in the arcuate portion 17 of the sharpened leading edge 4 during the cut-off operation. As the first actuator 14 continues to rotate the first jaw 2, the jaws are brought into the fully converged position (FIG. 6) thereby incrementally shear cutting the stock 11 through its entire thickness to cleanly sever the same to length with minimal jolt.

The cut-off mechanism of the present invention allows cut-off of relatively large stock with reduced jolt or jarring motion caused when larger diameter stock is shear cut.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A cut-off mechanism for severing elongate stock, comprising:

a first jaw having a first surface extending between a sharpened leading first cutting edge and a trailing edge, said first jaw defining first and second ends and an intermediate section therebetween;

a rotationally fixed second jaw having a second surface extending between a sharpened leading second cutting edge and a trailing edge;

a connector assembly pivotally interconnecting said first and second jaws in a side-by-side relationship at a location spaced apart from said first and second cutting edges, and positioning said leading cutting edges to shear cut elongate stock positioned therebetween, wherein said first jaw rotates with respect to said second jaw about said connector assembly, and said connector assembly includes a guide block and a U-shaped block translationally received therein, with a pin extending laterally through said U-shaped block and pivotally connecting said first jaw thereto, such that said first jaw is translationally guided within said guide block by said U-shaped block;

a hydraulic cylinder operably connected with at least one of said first and second jaws and mutually rotating the same, said hydraulic cylinder connected to said first jaw adjacent said second end and rotating said first jaw about said intermediate section;

said sharpened leading first cutting edge having a hook-shaped side elevational configuration extending arcuately between an outer tip portion thereof and an inner base portion thereof, said hook-shaped leading first cutting edge disposed adjacent said first end whereby when said first and second jaws are pivotally converged by said powered actuator, elongate stock positioned between said first and second cutting edges adjacent the outer tip portion of said first cutting edge is incrementally shear cut through its entire thickness to cleanly sever the same to length with minimal jolt.

2. The cut-off mechanism set forth in claim 1, wherein: said first and second surfaces are laterally inclined.

3. A cut-off mechanism for elongate stock, comprising:

a first jaw having a first surface extending between a sharpened leading first cutting edge and a trailing edge;

a second jaw having a second surface extending between a sharpened leading second cutting edge and a trailing edge;

a powered actuator;

a connector translationally and pivotally interconnecting said first and second jaws in a side-by-side relationship at a location spaced apart from said first and second cutting surfaces, said powered actuator operably connected to said first jaw and translating said first jaw relative to said second jaw between retracted and extended positions, said first jaw pivoting relative to said second jaw between a closed position and an open position providing sufficient clearance between said first and second jaws to permit translation of said first jaw to said extended position when stock is positioned proximate said second jaw, said connector providing translation of said first jaw when in said open position, said connector positioning said first and second cutting edges when said first jaw is in said extended position to shear cut stock positioned therebetween; and wherein said leading first cutting edge has a hook-shaped side elevational configuration extending arcuately between an outer tip portion thereof and an inner base portion thereof, whereby when said first and second jaws are converged, stock positioned between said first and second cutting edges adjacent the outer tip portion of said first cutting edge is incrementally shear cut through its entire thickness to cleanly sever the same to length with minimal jolt.

4. The cut-off mechanism set forth in claim 3, wherein:
said first and second surfaces are laterally inclined.

5. A cut-off mechanism for severing elongate stock, comprising:
a first jaw having a laterally inclined first cutting surface extending between a single sharpened leading edge and a trailing edge;
a second jaw having a laterally inclined second cutting surface extending between a single sharpened leading edge and a trailing edge;
a connector assembly pivotally interconnecting said first and second jaws in a side-by-side relationship at a location spaced apart from said first and second cutting surfaces, and positioning said leading edges of said first and second cutting surfaces to shear cut elongate stock positioned therebetween;
a hydraulic cylinder operably connected with at least one of said first and second jaws and mutually rotating the same;
said single leading edge of said first cutting surface having a hook-shaped side elevational configuration extending arcuately between an outer tip portion thereof and an inner base portion thereof, whereby when said first and second jaws are pivotally converged by said powered actuator, elongate stock positioned between said first and second cutting surfaces adjacent the outer tip portion of said leading edge of said first cutting surface, is incrementally shear cut through its entire thickness to cleanly sever the same to length with minimal jolt; wherein:
said second jaw is rotationally fixed;
said first jaw defines first and second ends and an intermediate section therebetween;
said single hook-shaped leading edge of said first cutting surface disposed adjacent said first end;
said hydraulic cylinder connected to said first jaw adjacent said second end and rotating said first jaw about said intermediate section;
said first jaw rotates with respect to said second jaw about said connector assembly;
said connector assembly includes a guide block and a U-shaped block translationally received therein, with a pin extending laterally through said U-shaped block and pivotally connecting said first jaw thereto, such that said first jaw is translationally guided within said guide block by said U-shaped block.

6. A cut-off mechanism as set forth in claim 5, wherein:
said connector defining a pivot axis; and
said leading edge of said first cutting surface has an angle in the range of 0 to 45 degrees relative to said pivot axis.

7. A cut-off mechanism as set forth in claim 6, wherein:
said leading edge of said second cutting surface has an angle in the range of 0 to 45 degrees relative to said pivot axis.

8. A cut-off mechanism as set forth in claim 7, wherein:
said outer tip portion and said inner base portion of said first cutting edge form a mutually included angle in the range of 90 to 160 degrees.

9. A cut-off mechanism as set forth in claim 8, wherein:
said leading edge of said first cutting surface has an arcuate portion disposed between said outer tip portion and said inner portion with a radius in the range of 0.125 to 0.375 inches.

10. A cut-off mechanism as set forth in claim 9, wherein:
said U-shaped block is slidably disposed in said guide block; and including:
a powered actuator that shifts said first jaw relative to said second jaw between an extended cutting position and a retracted storage position.

11. A cut-off mechanism as set forth in claim 9, wherein:
said inner portion of said leading edge of said first cutting surface is angled such that said leading edges of said first and second cutting surfaces form an angle in the range of 15 to 30 degrees when said leading edges of said first and second cutting surfaces initially contact the elongate stock to urge the stock into said arcuate portion.

12. A cut-off mechanism as set forth in claim 11, wherein:
said first and second cutting surfaces are formed by a hardened steel insert.

13. A cut-off mechanism for elongate stock, comprising:
a first jaw having a laterally inclined first cutting surface extending between a sharpened leading edge and a trailing edge;
a second jaw having a laterally inclined second cutting surface extending between a sharpened leading edge and a trailing edge;
a powered actuator;
a connector translationally and pivotally interconnecting said first and second jaws in a side-by-side relationship at a location spaced apart from said first and second cutting surfaces, said powered actuator connected to said first jaw and translating said first jaw relative to said second jaw between retracted and extended positions, said first jaw pivoting relative to said second jaw between a closed position and an open position providing sufficient clearance between said first and second jaws to permit translation of said first jaw to said extended position when stock is positioned proximate said second jaw, said connector providing translation of said first jaw when in said open position, said connector positioning said leading edges of said first and second cutting surfaces when said first jaw is in said extended position to shear cut stock positioned therebetween; and wherein
said leading edge of said first cutting surface has a hook-shaped side elevational configuration extending arcuately between an outer tip portion thereof and an inner base portion thereof, whereby when said first and second jaws are converged, stock positioned between said first and second cutting surfaces adjacent the outer tip portion of said cutting edge of said first cutting surface is incrementally shear cut through its entire thickness to cleanly sever the same to length with minimal jolt.

14. A cut-off mechanism as set forth in claim 13, wherein:

said connector includes a guide block; and said first jaw translates linearly with respect to said second jaw along said guide block.

15. A cut-off mechanism as set forth in claim 14, including:

a motor operably connected with said first jaw and rotating the same to a fully converged position with respect to said second jaw.

16. A cut-off mechanism as set forth in claim 15, wherein:

said cutting edge of said first cutting surface has an arcuate portion disposed between said outer tip portion and said inner base portion with a radius in the range of 0.100 to 0.375 inches.

17. A cut-off mechanism as set forth in claim 16, wherein:

said first and second jaws each include an elongate body portion and first and second inserts forming said first and second cutting surfaces, said inserts having a keyed connection to said elongate body portions.

* * * * *